Oct. 4, 1938.   H. J. L. FRANK ET AL   2,132,022
TROLLEY COLLECTOR FOR ELECTRICAL DISTRIBUTION SYSTEMS
Original Filed Jan. 14, 1935   3 Sheets-Sheet 1

Oct. 4, 1938.   H. J. L. FRANK ET AL   2,132,022
TROLLEY COLLECTOR FOR ELECTRICAL DISTRIBUTION SYSTEMS
Original Filed Jan. 14, 1935    3 Sheets-Sheet 2
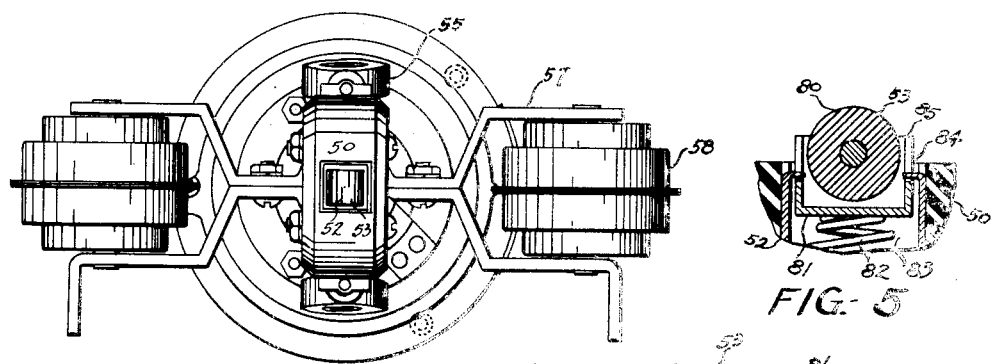
FIG.-2
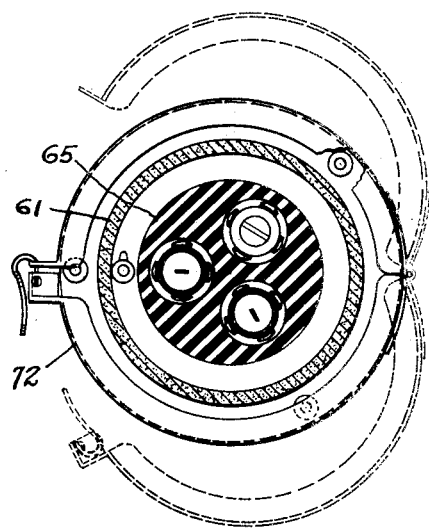
FIG.-3
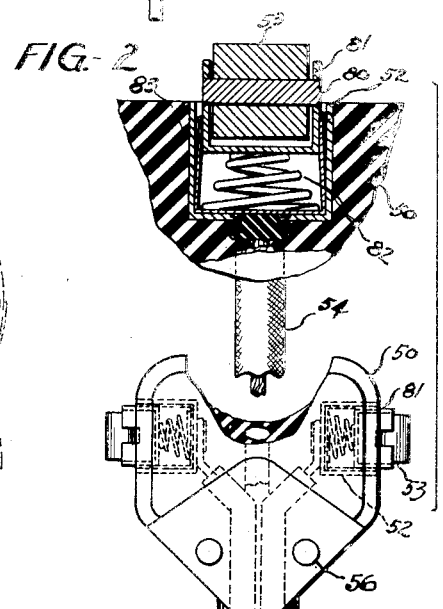
FIG.-4
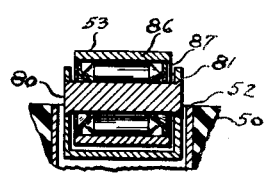
FIG.-6
INVENTORS.
Harrison J. L. Frank, Joseph C. Messing.
BY
Daniel G. Cullen
ATTORNEY.

Oct. 4, 1938.   H. J. L. FRANK ET AL   2,132,022
TROLLEY COLLECTOR FOR ELECTRICAL DISTRIBUTION SYSTEMS
Original Filed Jan. 14, 1935   3 Sheets-Sheet 3
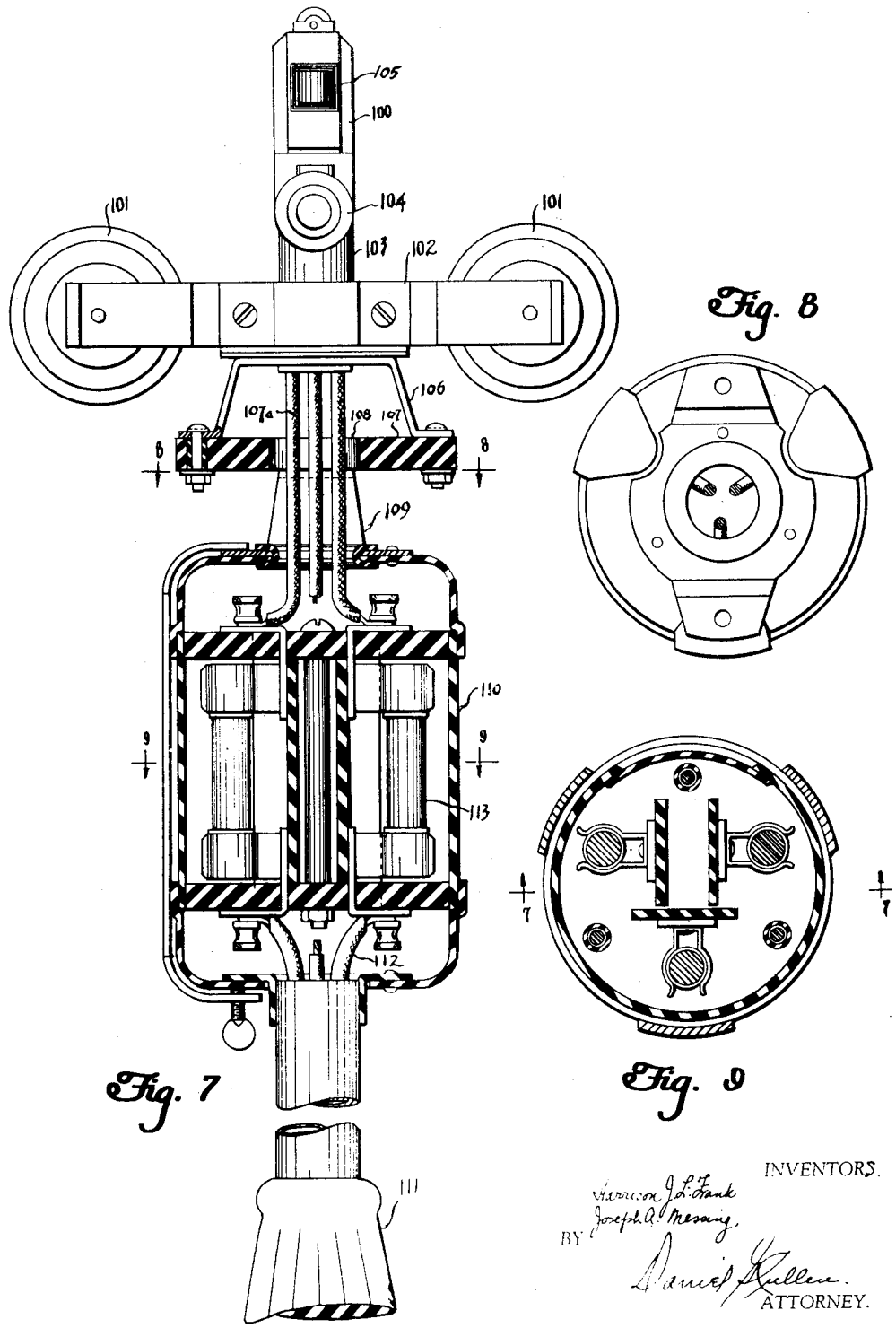

Patented Oct. 4, 1938

2,132,022

UNITED STATES PATENT OFFICE 2,132,022

TROLLEY COLLECTOR FOR ELECTRICAL DISTRIBUTION SYSTEMS

Harrison J. L. Frank and Joseph A. Messing, Detroit, Mich.

Original application January 14, 1935, Serial No. 1,660. Divided and this application August 31, 1935, Serial No. 38,841

1 Claim. (Cl. 191—45)

This application relates to improvements in trolleys or collectors intended for use with trolley ducts of electrical distribution systems, and is a division of application Serial No. 1,660, filed January 14, 1935.

Each collector disclosed includes a collector head made of a properly conformed block of molded material, such as rubber, the block having embedded therein contact rollers for engaging the bus bars of the trolley duct and also having imbedded therein branch circuit conductors electrically connected to the rollers.

The use of molded rubber for the head of a trolley or collector is of advantage for the reasons that the resilience of the rubber insures perfect alignment of collector contacts with bus bars by providing universal and multi-directional movement of the contacts, maintains adequate contact pressure on the collector contacts, minimizes the necessity for using for the contacts springs, hinges, additional connections, etc., minimizes the possibility of injury to contacts and the head itself by providing a resilient thrust and shock absorption means for the head and a resilient mounting for the collector parts, and also for the reasons that rubber is an insulating material and therefore adequately insulates the contacts and their conductors from one another, even if these conductors be bare rather than insulated by their own shrouds.

The collectors disclosed are further characterized by the fact that the depending portions thereof which ride outside of the duct are formed to include a means for mounting fuses for branch circuit protection.

The collectors disclosed are also characterized by the fact that the depending portions thereof which ride outside of the duct are connected to the head portions which ride inside the duct through the medium of flexible universal joints, whereby loads or pulls on the depending portions, regardless of the direction from which these are exerted, will cause the trolleys to ride along the duct. In the disclosed embodiments, the depending portions are, strictly speaking, handles whereby the trolleys may be manually moved along the duct.

In one of the collectors, that part of the depending portion which encloses the fuses may be made of resilient material so that that part in and of itself constitutes a universal joint connecting the depending portion and the trolley head.

These and other characteristics of the constructions of this application may well be understood upon reference to the appended drawings, which disclose the collectors of this application. In these drawings—

Figs. 1, 1a, and 2 are side, end, and plan views of one form of collector;

Fig. 3 is a section on line 3—3 of Fig. 1;

Fig. 4 is an exploded view of the head per se of the trolley of Figs. 1–3, with a contact mounting being shown to enlarged scale;

Figs. 5 and 6 show contact mounting details;

Fig. 7 shows a second form of collector;

Figure 1:
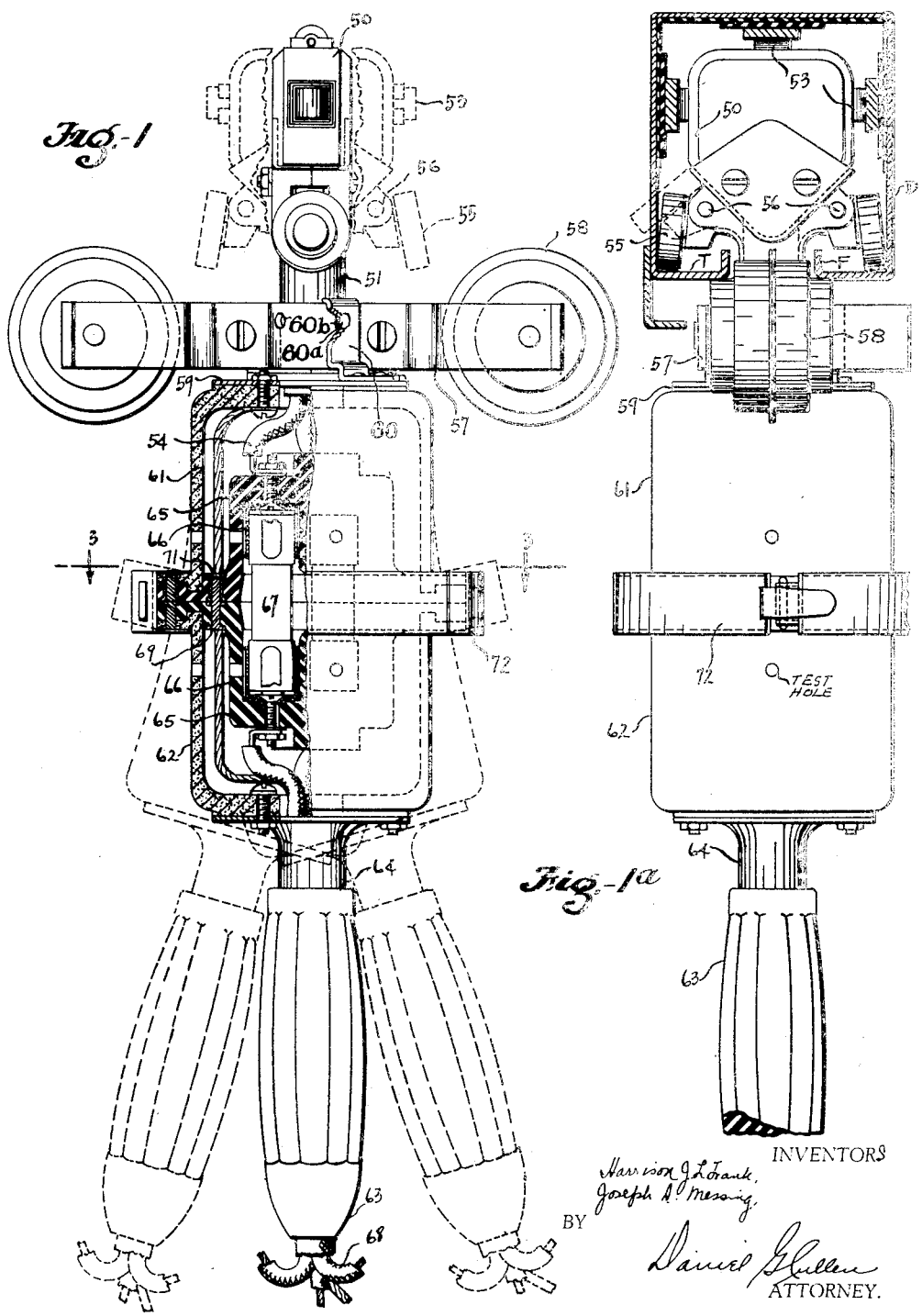

Figs. 8 and 9 are sections as if on line 8—8 and 9—9 of Fig. 7.

The collector of Figs. 1–6

In Figs. 1–6 there is shown a collector which is intended to be an improvement over the collector shown in Patent No. 2,018,016 to Harrison J. L. Frank and Joseph A. Messing, and which collector, like the one of the prior application, includes a head insertable into the trolley duct and a depending portion carried by the head.

The collector head comprises a block 50 of molded insulating material, preferably resilient rubber, of generally pentagonal shape and provided with a stem 51 projecting downwardly from its apex. Imbedded in the block on three edges thereof are cups 52 containing contact rollers 53 for engagement with the bus bars of the trolley duct with which the collector is intended to be used; also imbedded in the block are branch circuit conductors 54 connected to these cups and contact rollers in a manner that will be described, the conductors passing through the stem 51 of the head so as to be shielded by the latter.

Journalled on the head and projecting from the edges thereof in opposite directions are supporting rollers 55 for engagement with the lower or track surfaces T of the trolley duct D and the pivotal mountings 56 for these rollers are such that the rollers are movable a substantial distance with respect to the head, so that the rollers may rise over and clear the flanges F of the duct tracks when the head is inserted into the duct, even though the head is not lifted clear of the flanges F. The pivotal mounting for the wheels also tends to compensate for side thrust as well as to support the trolley.

Journalled on the stem is a cross bar 57 formed of two straps secured to each other and the ends of the cross bar are provided with rollers 58 for riding against the under surface of the duct and in the slot thereof in a manner that can clearly be understood. Each of these rollers functions as a side and vertical thrust roller, and may well be replaced by a plurality of rollers individually compensating for side and vertical thrust, such as two horizontally axled and one vertically axled roller.

On the lower end of the stem is secured a thimble 59 to which is riveted a lug 60 having fixed to it a pin 60a projecting inwardly towards the post and adapted to seat its inner end into either one of two holes 60b formed in the cross bar 90° apart for indexing the cross bar with respect to the thimble 59 and the stem 51 in either one of two positions 90° apart.

To thimble 59 is adapted to be bolted a cup 61 of resilient material, such as rubber, and with this cup is intended to cooperate a second cup 62 of similar material connected to the upper end of a hollow handle 63 through the medium of bolts and a thimble 64 secured to the upper end of the handle, the combination of the cups and the associated parts, and the handle, providing the depending portion of the trolley which rides outside of the duct.

Within the cups are blocks 65 of non-resilient moulded material having oppositely facing fuse holders 66 for the reception of the terminals of fuses 67 which protect the branch circuit provided by the conductors 54 of the head and the conductors 68 within the handle, these sets of conductors being electrically interconnected through the fuse holders and fuses.

For properly orienting the lower cup and its parts with respect to the upper cup and its parts, to insure proper polarization, a suitably positioned keying pin 69 on the lower cup and a cooperating tubular rivet 71 are provided; and for clamping the two cups and their associated parts to each other there is provided a clamp generally referenced 72, of conventional pivotal construction.

It will be observed that the assembly of the handle 63, the lower cup 62 on the upper end thereof, and the fuses 67 mounted with their ends disposed within the fuse holders 66 of the lower cup, may be connected to the upper cup by plugging in, to complete the circuit from the head to the branch load through the two cups and their associated parts; and that when the lower cup parts are plugged onto the upper cup parts it is merely necessary to tighten up the clamp 72 to create a satisfactory mechanical connection between the branch circuit conductors which lead to the branch load and those in the head of the collector.

It will also be observed that the flexibility of the cups provides a universal joint between the handle and the head, and a universal joint between the depending portion of the collector and the head part.

It will also be observed that the use of rubber as a head material is of advantage in that rubber can be molded readily to the end that facile fabrication of a collector head is assured.

*Contact roller mountings*

In Figs. 4-6 there are shown mountings for the contact rollers of the collector head.

In Fig. 4 the contact roller 53 is shown as supported upon an axle 80 journalled in the opposite sides of a movable cup 81, the whole being slidably mounted in the metal cup 52 imbedded in the head 50, there being a coiled compression spring 82 disposed between the bases of the cups 52—81 for urging the roller outwardly of the cup 52 and into contacting engagement with the duct bus bars. To the base of the fixed cup 52 is electrically connected the end of the branch circuit conductor 54 associated therewith, and the circuit from the contact roller to the conductor is completed through the coiled spring 82.

Since the coiled spring alone may be considered as offering too great a resistance to the flow of current, it is preferred to provide a parallel path and for this reason a U-shaped brush 83 is disposed within the fixed cup 52 with its bight engaged by the base of the coiled spring. The brush is made of high conductivity metal and its sides are formed resilient to engage the sides of the movable cup 81 which journals the axle of the contact roller.

In order to prevent the contact roller from being projected too far out of the fixed cup by the coiled spring, the fixed cup 52 may be provided with lugs 84 (Fig. 5) cooperating with slots 85 formed in the movable cup 81 which journals the roller, and these lugs will effectively prevent excessive movement of the movable cup with respect to the fixed cup.

Since it is desired to have the rollers move along the bus bars with as little friction as possible it is contemplated to provide the rollers with frictionless bearings, and in Fig. 6 there is shown a detailed construction wherein the roller is so formed, the frictionless bearings being referenced 86 and being provided with end plates 87 disposed within the hollow rollers.

It will be observed that while springs 82 are used to provide adequate contact pressure for the contact rollers 53, that the resilience of the rubber head may also be employed to insure adequate contact pressure.

It will also be observed that the heads may be inserted into the duct through the slot thereof with little fear of breakage by contact with duct parts; this is because the heads are made of rubber, and this would not be true if the heads were made of other materials.

*The collector of Figs. 7–9*

In these figures there is shown a collector whose head is similar to that of the collector of Figs. 1–3 inclusive, but whose depending portion is differently constructed. In these figures the head is referenced 100 and is shown as including a pair of wheels 101 mounted on the ends of a cross bar 102 in turn journalled on the stem part 103 of the head. In addition to the rollers 101 there are of course riding wheels 104 and roller wheel contacts 105. It is intended that the head parts here referenced correspond to the head parts of the collector of Figs. 1–4.

Disposed against and secured to the lower end of the stem 103 of the collector head is a metal yoke 106 which is secured to an apertured plate 107 of resilient material, such as rubber, and the branch circuit conductors 107a projecting through the central aperture 108 of this plate.

Depending from this plate and supported thereby through the medium of lugs 109 is a fuse shell 110 which in general resembles the fuse shell shown in the patent to Frank, No. 1,887,089, dated November 8, 1932, this fuse shell having a window provided with a rotatable cover by means of which access into the shell may be attained. Since the shell per se of this application in and of itself forms no important part of the inventions of this application, the details of construction of the shell will not be described specifically, it being understood that reference may be had to the above mentioned patent for an understanding of the construction of this shell.

To the lower end of the shell 110 is secured a hollow handle 111 through which pass branch circuit conductors 112 having their terminals electrically connected to the branch circuit conductors 107a projecting from the head, the connection being effected through the medium of the fuses 113 within the shell.

The resilient plate 107 provides a flexible or universal joint between the head and the depending portion of the collector whereby pull on the handle in any direction having a component parallel to the longitudinal axis of the duct will cause movement of the collector along the duct.

We claim:

As part of a system employing a stationary slotted tube duct and trolleys, a trolley comprising an elongated narrow head made of soft rubber and proportioned to be insertable into the duct through the slot thereof when its long dimension is parallel to the run of the duct and to straddle the duct slot when its long dimension is transverse of the run of the duct, a post upon whose upper end is fixedly disposed the head, a cross bar rotatably mounted on the post below the head, means for indexing the cross bar and the post relatively so that the cross bar may be locked to the post in either one of two positions which are perpendicular to each other, means on the head and cross bar for interlocking the head and cross bar and post as a unit to the duct against substantial movement in all directions transverse to the run of the trolley along the duct, the means including supporting and collector wheels on the head, all engaging interior surfaces of the duct, thrust preventing wheels on the ends of the cross bar and longitudinally spaced along the duct a considerable distance to prevent rocking of the head and cross bar and post with respect to the duct and engaging the lower outside surface of the duct, the post projecting through the duct slot to outside the duct, and a rigid trolley manipulating portion connected to and supported by and suspended from the post so as to ride with it but in a path remote from the duct and arranged with its center of gravity between the longitdinally spaced thrust preventing wheels, the connection comprising a universal joint closely adjacent the cross bar and which permits substantially all of the depending portion below the cross bar to move universally relative to the post without rocking it, the supporting wheels being journalled on the head in a manner that permits these wheels to rock with respect to the head, as well as to rotate with respect to the head.

HARRISON J. L. FRANK.
JOSEPH A. MESSING.